May 8, 1956  H. H. WANDERS  2,744,289
MACHINE FOR MOLDING A SUCCESSION OF BEADS ON A WIRE
Filed April 18, 1952  4 Sheets-Sheet 1
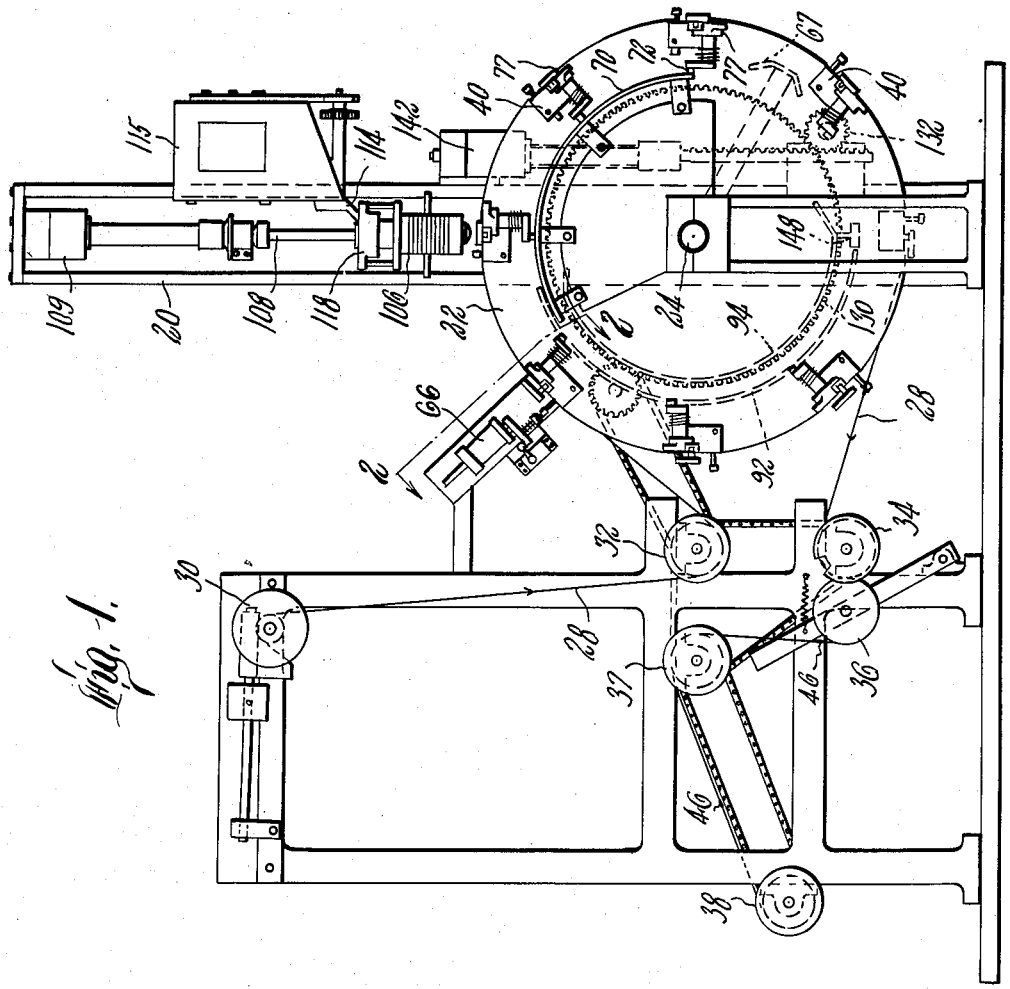
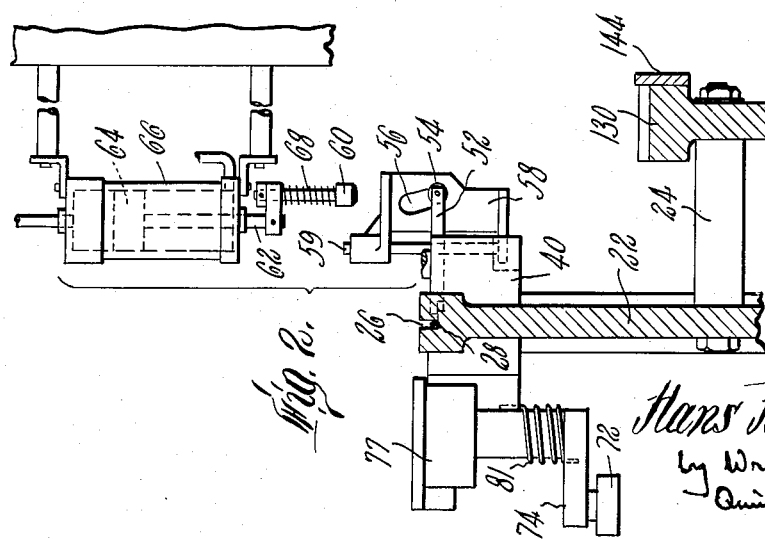
Inventor
Hans H. Wanders
by Wright, Brown,
Quinby May Attys.

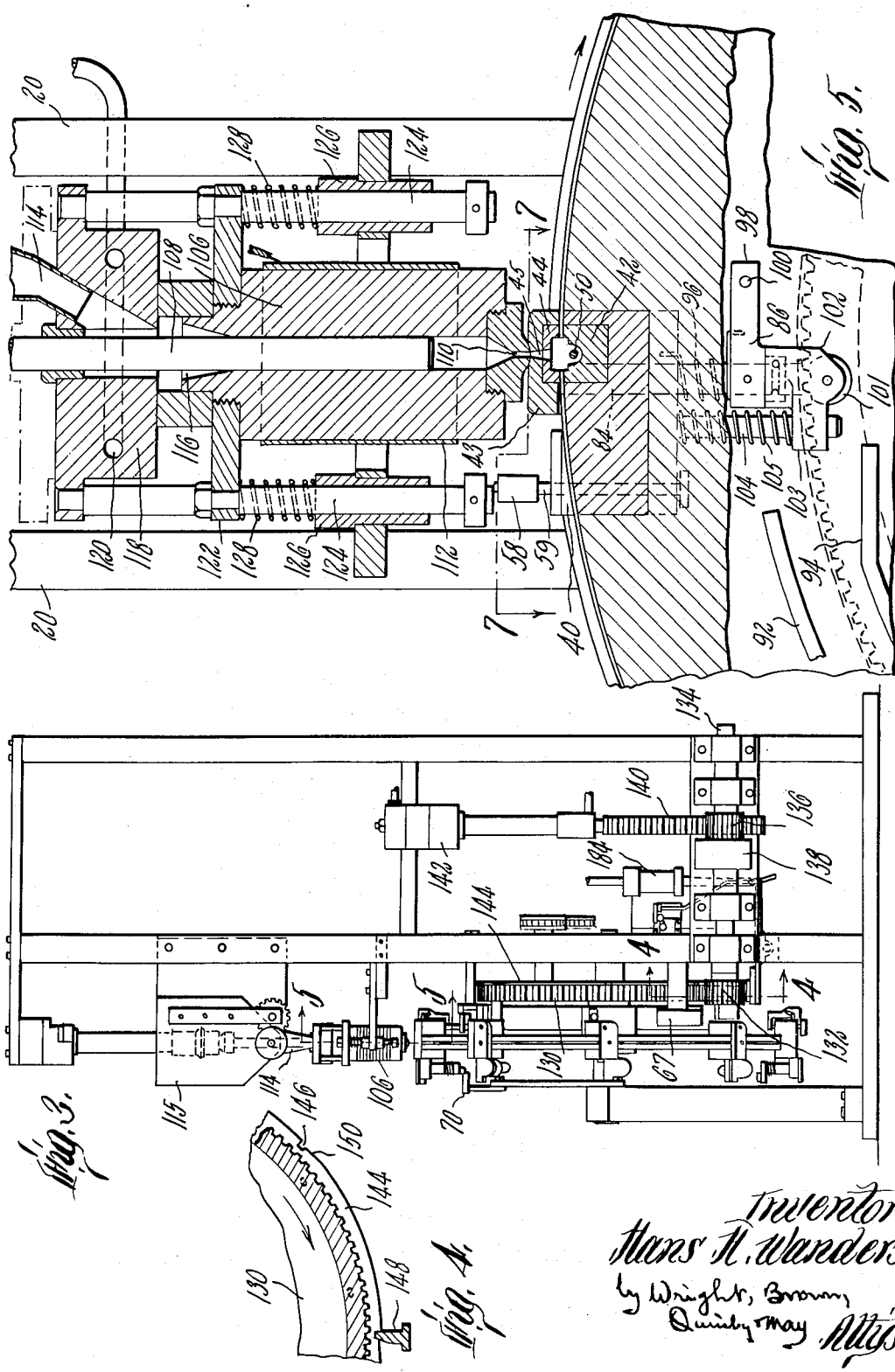

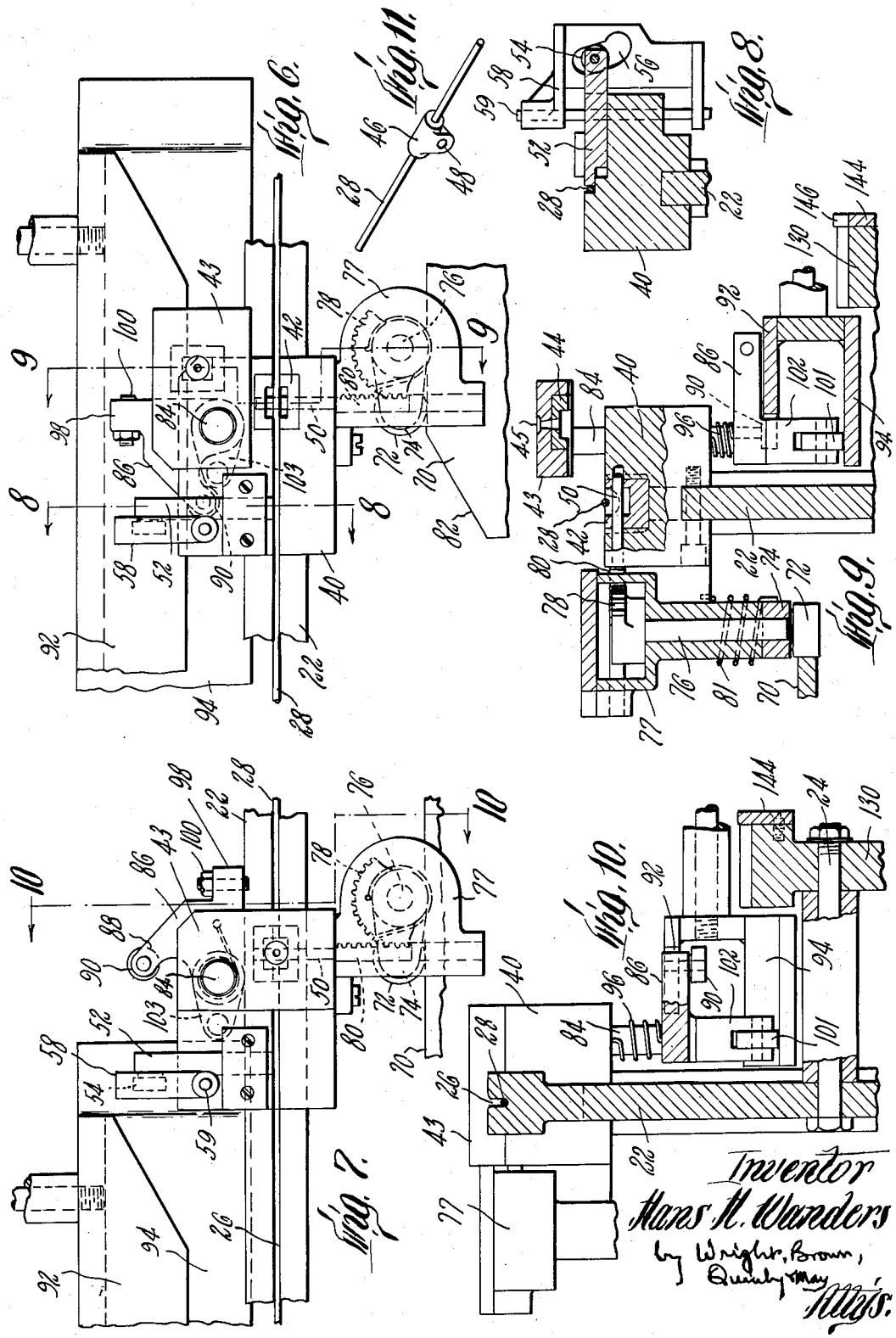

May 8, 1956     H. H. WANDERS     2,744,289
MACHINE FOR MOLDING A SUCCESSION OF BEADS ON A WIRE
Filed April 18, 1952     4 Sheets-Sheet 4

Inventor
Hans H. Wanders
by Wright, Brown,
Quinby & May Attys.

United States Patent Office 2,744,289
Patented May 8, 1956

2,744,289

MACHINE FOR MOLDING A SUCCESSION OF BEADS ON A WIRE

Hans H. Wanders, Hingham, Mass.

Application April 18, 1952, Serial No. 283,083

2 Claims. (Cl. 18—21)

This invention relates to a machine for feeding a wire of unlimited length in a step-by-step progression and for molding spaced beads in succession on the wire, the molding operation taking place during brief dwells in the feed of wire. The machine comprises a wheel mounted to revolve about a horizontal axis. Uniformly spaced apart on the periphery of the wheel are a series of molds, each mold having associated therewith mechanism for closing and opening the mold, inserting and withdrawing a core element if the beads are to have a hole therethrough as hereinafter described, and gripping the wire before the molding operation and releasing it afterwards. The perimeter of the wheel is grooved to receive the wire which extends around a considerable portion of the circumference. Above the wheel is an injection device for injecting fluid plastic into the successive molds to solidify therein. The wheel is indexed to bring the molds successively into operative relation with the injector. The machine includes apparatus for performing the steps of operation in a predetermined sequence so that the operation of the machine is entirely automatic.

For a more complete understanding of the invention reference may be had to the following description and to the drawings, of which—

Figure 1 is a front elevation of a machine embodying the invention;

Figure 2 is a section on the line 2—2 of Figure 1;

Figure 3 is a side elevation of the machine shown in Figure 1;

Figure 4 is a fragmentary section taken on the line 4—4 of Figure 3;

Figure 5 is a section, on a larger scale, taken on the line 5—5 of Figure 3;

Figure 6 is a fragmentary plan view of the wheel with a mold unit and associated cams, the mold being open;

Figure 7 is a view similar to Figure 6 but showing the parts in a different position of operation, this view being indicated by the line 7—7 of Figure 5;

Figure 8 is a section on the line 8—8 of Figure 6;

Figure 9 is a section on the line 9—9 of Figure 6;

Figure 10 is a section of the line 10—10 of Figure 7;

Figure 11 is a perspective view of a bead molded on a wire, and

Figure 12:
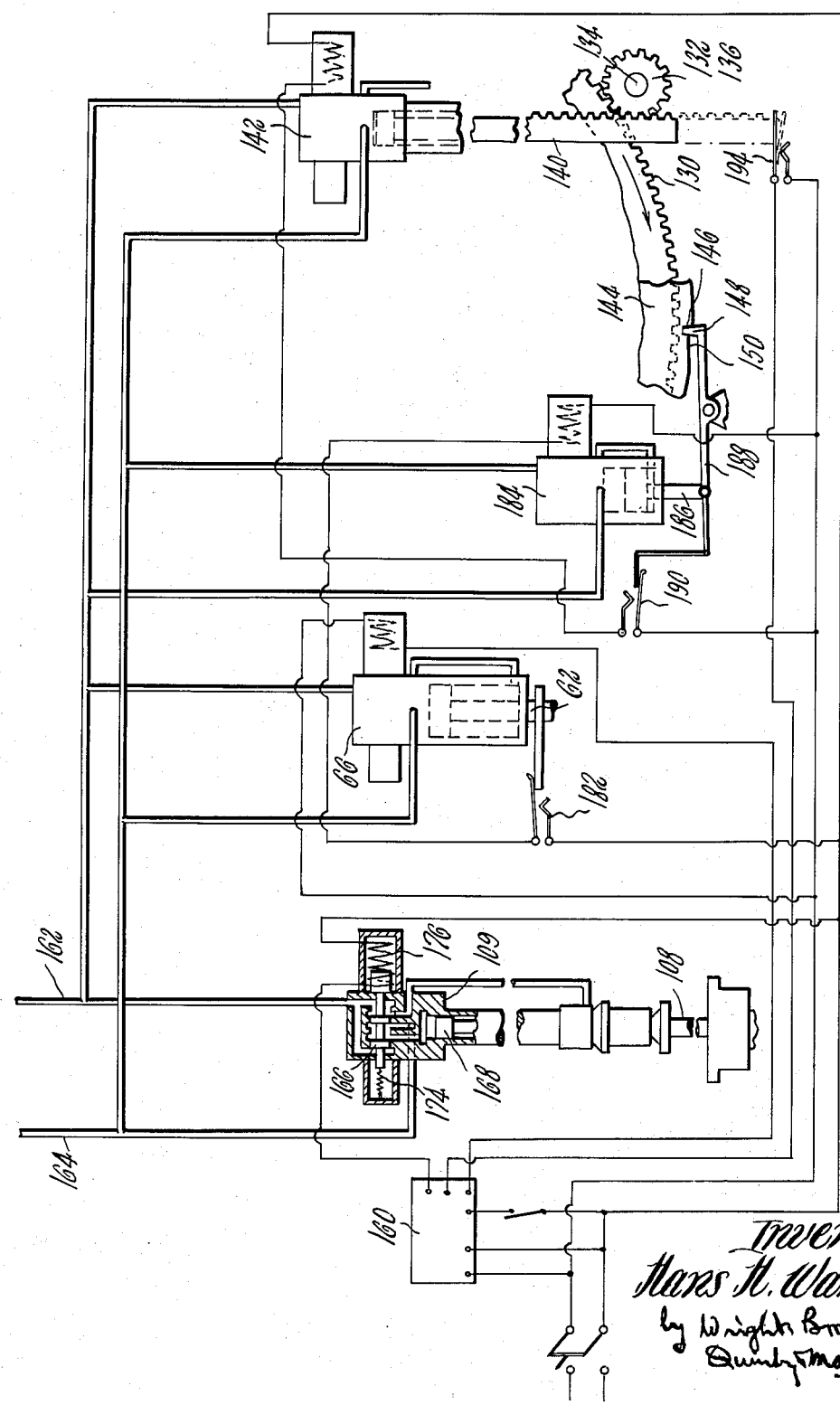
Figure 12 is a wiring diagram showing the control means for automatic operation of the machine.

The machine illustrated on the drawings comprises a vertical standard or support 20 on which is mounted a wheel 22 rotatable on a horizontal axis 24. As indicated in Figure 2 the wheel 22 has a groove 26 in its perimeter adapted to receive a wire 28 as the latter is unrolled from a spool 30. The wire may be led around a pulley 32 and then around a considerable portion of the perimeter of the wheel 22. During its travel around the wheel 22, the beads are molded on the wire at uniformly spaced points. The wire having the beads thereon goes from the perimeter of the wheel 22 to a pully 34 and around another pulley 36 which is pressed against the perimeter of the pulley 34. From the pulley 36 the wire goes to a pulley 37 and thence to a take up spool 38.

On the peripheral margin of the wheel 22 are mounted a series of uniformly spaced blocks 40, each block containing the bottom portion 42 of a mold. A cover 43 containing the top portion 44 of the mold is carried by the wheel but is movable relatively to the bottom member so as to close and open the mold. A sprue 45 is provided in the top of each mold for the introduction of plastic material into the mold cavity. In the machine illustrated on the drawings the molds are designed to form beads having a shape such as is illustrated at 46 in Figure 11. This shape consists of a cylindrical portion coaxial with the wire and a lateral projection through which extends a transverse hole 48. Other shapes and sizes can be obtained by using other corresponding molds. The hole 48 in each bead is produced by means of a core pin 50 (Figures 6 and 9) which is inserted through the cavity of the mold prior to the molding operation and is withdrawn after the mold has been filled with liquefied material and the material has solidified in the mold.

Any desired number of mold blocks may be formed on the perimeter of the wheel 22, eight such blocks being illustrated in Figure 1. In order to prevent the wire from slipping longitudinally in the groove during or after a molding operation, a gripping device is provided with each mold block. This gripping device is operated, as hereinafter described, to grip the wire shortly after it enters the groove and before it reaches the station at which liquefied material is injected into the mold. The gripping member is maintained in its gripping position until the portion of the perimeter of the wheel on which it is mounted approaches the point where the wire leaves the wheel.

As illustrated at Figures 2, 7 and 8 of the drawings, the wire gripping member comprises a bar 52 which is slidably mounted in the block 40 so as to be movable in a direction perpendicular to the groove 26. One end of the bar 52 is adapted to be pressed against the wire 28 so as to push it against the opposite wall of the groove 26 and thus to clamp it in the groove. At the other end of the bar 52 is a roller 54 which rides in the cam slot 56 in a vertically movable member 58 carried by the block 40, the member 58 having a vertical rod 59 which is slidably fitted in a bore through the block. As indicated in Figures 2 and 8, the cam slot 56 is so shaped that when the member 58 is pushed radially inward or, as shown in Figures 2 and 8, downward, the sides of the slot 56 act on the roller 54 to push the bar 52 against the wire 28 to grip the same. The slotted member 58 is pushed down by a plunger 60 which is carried by a piston rod 62, the latter being attached to a piston 64 reciprocable in the cylinder of a hydraulic actuator 66. The plunger 60 is pressed downward by a spring 68 so that it can yield if the piston 64 descends too far. When the piston 64 operates to press the cam member 58 down, it is then promptly retracted leaving the cam member in the position shown in Figure 8 so that the wire 28 is gripped continuously until the cam member 58 is subsequently moved outward by a cam 67 carried by the standard 22 at the four o'clock position of the wheel (Figure 1).

After the wire has been gripped, the core pin is inserted through the lower portion of the mold and across the mold cavity. The mold is then closed and is ready to receive an injection of liquefied material to be solidified therein. For the insertion of the core pin 50 a pin-operating cam member 70 is mounted on the support 20 in a fixed position. This cam member is arcuate as shown in Figure 1 and cooperates with a cam follower 72 which is a roller carried by an arm 74 which is pivotally mounted as at 76 in a housing 77 attached to the block 40. Also rockable about the axis 76 with the arm 74 is a gear segment 78 which meshes with a slidable rack 80, the pin 50 being an extension of the rack 80. These operating parts for the core pin 50 are all carried by the block 40. A spring 81 keeps the roller 72 pressed against the edge of the cam member 70.

When the block is advanced by indexing rotation of the wheel 22 so that the block moves toward the right as shown in Figures 6 and 7, the roller 72 rides on a sloping portion 82 of the cam 70 and rocks the gear segment 78 so as to push the pin 50 through the mold cavity as indicated in Figures 6 and 7. The cam 70 maintains the pin in such position until the roller 72 rides off the further end of the cam when the block reaches the three o'clock position indicated in Figure 1 whereupon the spring 81 rotates the gear sector 78 to retract the pin. By this time the material in the mold cavity will have solidified so that the retraction of the pin leaves a hole in the bead.

The mold is opened and closed automatically by cam means, one cam being provided to lift the cover 43, that is, to move it radially outward away from the block 40, the other cam being arranged to swing the cover so that the cavity in the bottom member 42 of the mold will be exposed and the bead formed therein can readily be removed. The cover 43 is mounted on the outer end of a shaft 84 which extends slidably and rotatably through the block 40. On the shaft 84 near its lower end is mounted a plate 86 having two projecting arms as indicated in Figures 6 and 7. One of these arms 88 carries a camp follower 90 which is a roller adapted to ride against the edge of a cam 92 which, as shown in Figure 1, extends from the six o'clock position to the eleven o'clock position on the wheel 22. The discharge end of this cam is shown in Figures 6 and 7, Figure 6 showing the block 40 and the parts carried thereby moving toward the right. Figure 7 shows the block after it is moved beyond the discharge end of the cam 92 and also beyond the discharge end of a cam 94 which maintains the cover 43 in its raised or outward position. A spring 96 is coiled around the portion of the shaft 84 between the block 40 and the plate 86, this spring serving the double purpose of pressing the cover 43 and plate 86 in a clockwise direction as seen in Figures 6 and 7 so as to hold the cam follower 90 against the edge of the cam 92 until it rides clear of the cam as in Figure 7, and pushing the cover 43 downward. The plate 86 has a second arm 98 which carries a set screw 100. This set screw is a stop element which bears against a face of the wheel 22 when the plate 86 and cover 43 move beyond the cam 92 so as to turn to the position shown in Figure 7 wherein the top element 44 of the mold is directly over the bottom element 42. By adjusting the stop 100, the cover 43 can be stopped in such a position that the mold top 44 will register accurately with the mold bottom 42.

To elevate the cover 43 (that is, move it radially outward) a cam follower is swivelly mounted on the shaft 84 immediately below the plate 86 to engage the cam 94. The cam follower shown in Figures 5, 9 and 10 includes a roller 101 carried by a forked bearing member 102. The swivel connection between the member 102 and the shaft 84 is to enable the latter to turn without turning the former. To prevent turning the member 102, it is provided with an arm 103 having a hole in which slides a fixed pin 104 (Figure 5) projecting down from the block 40. A compressed spring 105 between the block and the arm 103 helps the spring 96 to press the cover 43 downward when the roller leaves the cam 94. When the roller 101 rides on the cam 94 at the six o'clock position on the wheel 22, the cover 43 is moved radially outward and is immediately swung to one side as the cam follower 90 engages the cam 92. This occurs just before the wire 28 leaves the perimeter of the wheel 22, so that the bead in the mold is then free to move outward and be carried with the wire. The mold then remains open until it reaches the eleven o'clock position on the wheel, which is the wire-gripping station, whereupon the cover is swung over the bottom member of the mold and is allowed to be moved radially inward by the spring 96 so as to close the mold just before the mold reaches the station where it registers with the injector by which liquefied plastic is to be injected into the mold cavity.

The injection apparatus is illustrated in detail in Figure 5 and comprises a vertical block 106 having a central bore therethrough in which is slidably fitted a plunger 108. This plunger is reciprocated by a hydraulic actuator 109 to press and liquefy granular plastic material and to eject the liquid through a nozzle 110 which is pressed against the cover 43 so that the orifice of the nozzle registers with the sprue 45. An electric heating element 112 surrounds the block 106 to maintain the block at the elevated temperature required for the liquefaction of the plastic material which is pressed by the plunger 108. The plunger is periodically retracted so as to allow a metered amount of granular plastic material to be fed through a conduit 114 from a bin 115 into a hopper 116 at the upper end of the bore of the block 106. Above the block 106 is a head 118 which is cooled by a circulating system 120 through which water is supplied. This prevents premature heating of the plastic material. Between the block 106 and the head 118 is a cross bar 122 to the end of which are secured vertical guide rolls 124. These rods slide through sleeves 126 which are supported by the standard 20. Springs 128 are provided between the sleeves 126 and the cross bar 122 in order to press the assembly including the block 106 upward. When the wheel has been indexed so as to bring a mold into line with the nozzle 110, the plunger 108 is forced downward. The plunger engages the charge of granular plastic material in the bore and applies an increasing pressure to such material so as to cooperate with the heat to liquefy the material. A fraction of such pressure is sufficient to push the block 106 and the other members associated therewith down against the opposing force of the springs 128 so that the nozzle 110 is pressed against a slight depression of the top on the cover 43 around the orifice of the sprue 45. Further descent of the plunger 108 forces the liquefied plastic into the mold so as to fill the mold cavity. The plunger is then retracted, permitting the assembly including the block 106 to be elevated by the springs 128 and leaving the mold block clear for further indexing of the wheel. This operation is repeated each time the next succeeding mold is moved into alignment with the injection nozzle 110.

The wheel 22 which carries the series of molds is indexed or rotated step by step by any suitable mechanism, such as that illustrated in Figure 3. Mounted on the shaft which carries the wheel 22 is a large gear wheel 130 which meshes with a pinion 132 located near the bottom thereof as indicated in Figure 1. The pinion 132 is mounted on a shaft 134 which also carries a pinion 136. The latter is operatively connected to the shaft 134 through a one way clutch 138. The pinion 136 meshes with a vertical rack 140 which is reciprocated by a hydraulic actuator 142. The one way clutch 138 is arranged so that when the rack 140 descends, it rotates the shaft 134 and the pinion 132. Since the pinion 132 meshes with the large gear wheel 130 the result is the indexing of the wheel 22 through a sufficient angle to bring the next successive mold into registry with the injector. When the rack 140 is elevated to the position shown in Figure 3 the clutch 138 permits the pinion 136 to turn without rotating the shaft 134. In order to provide for accurate registration between the molds and the nozzle 110, the gear wheel 130 is provided with a flange 144, this flange having a series of notches 146 corresponding in number and position to the molds carried by the wheel 22. A locking lug 148 is arranged to be pressed against the perimeter of the flange 144 so that when the wheel is being rotated, the locking lug will enter the next notch 146 and thus lock the wheel accurately in the correct position for registration of one of the molds with the injector. At the end of a molding operation, the lug 148 is retracted from the notch 146 and the wheel is immediately rotated until the lug enters the next successive notch. The portions of the perimeter of the flange 114 approaching the notches 146 are relieved as at 150 so that the locking lug cannot jump across a notch 146.

Apparatus for controlling the various mechanisms in the machine for completely automatic operation is diagrammatically illustrated in Figure 12. Electric power is provided from any suitable source, connections being made with a timing device 160 by which certain of the operations are controlled automatically by means well known in the art. Fluid under pressure is supplied through a supply pipe 162 to the hydraulic actuators 109, 66 and 142 for operation of the injector, the wire-gripper and the wheel indexing mechanism respectively. An exhaust pipe 164 is connected to these actuators to carry away discharged liquid, as shown in Figure 12. The hydraulic actuators may be similar in structure, the actuator 109 being shown partly in section to indicate the working parts. Within the housing of the actuator is a double valve member 166 which is so arranged that when it is in one position pressure will be applied to one side of a piston 168 which is connected to the plunger 108. The valve 166 is movable to another position in which pressure fluid is directed against the other side of the piston 168. A spring 174 tends to hold the valve member 166 in one of its positions. A solenoid 176 is arranged to move the valve member 166 to its other position when the solenoid is energized. The spring 174 restores the valve to its original position as soon as the solenoid 176 is deenergized.

A cycle of operations is started when the timer 160 (Figure 12) energizes the solenoid controlling the hydraulic actuator 66 by which the piston rod 62 is forced downward so as to operate the wire-gripping apparatus hereinbefore described. The timer is arranged to cause the piston rod 62 to descend its full stroke and then to be retracted at once to its normal position. As it starts its downward stroke a switch 182 is closed. This switch remains closed during the downward and upward strokes of the piston rod 62. The closing of the switch 182 energizes the solenoid which operates a hydraulic actuator 184 so as to raise a piston rod 186 which rocks a lever 188 carrying the locking lug 148. The upward movement of the piston rod 186 momentarily moves the lug 148 out of the notch 146 in which it is then engaged, thus releasing the wheel 22 for rotative movement. The initial upward movement of the piston rod 186 results in a closing of a switch 190 which energizes a solenoid controlling the hydraulic actuator 142 whereby the rack 140 is pushed downward, thus rotating the wheel 22. Shortly after the actuator 184 has been operated to retract the lug 148, the return stroke of the piston rod 62 results in the opening of the switch 182 and the consequent deenergizing of the solenoid in the actuator 184. The actuator then tends to rock the lever 188 in the other direction. Since the lug 148 is then between two of the notches 146, it is pressed against the perimeter of the flange 144 and the lever 188 is thus prevented from rocking far enough to open the switch 190 until the lug 148 reaches and enters the next notch 146. This opens the switch 190, the rack 140 being then at the end of its driving stroke. At this moment the lower end of the rack closes a switch 194 momentarily, closing a circuit which operates through the timer 160 to start the working stroke of the injector 108 and to cause the retraction of the injector 108 after the working stroke has been completed. Meanwhile, when the lug 148 enters the next notch 146 and opens the switch 190, the solenoid in the actuator 142 is deenergized and the rack 140 is at once retracted to be ready for the next working stroke to rotate the wheel 22.

When the timer has brought about the reciprocation of the plunger 108 through a working stroke and the return stroke, it then operates to energize the solenoid of the actuator 66, thus starting the next cycle of operations.

I claim:

1. A machine of the class described comprising a support, a wheel rotatable on said support, said wheel having a circumferential wire-receiving groove therein, a series of separate molds spaced at intervals along the circumference of said wheel, each said mold having a bottom part fixed on said wheel and a cover part carried by said wheel and movable radially outward and aside to open the mold, means for imparting step-by-step rotation to said wheel to move said molds successively to a molding station with a dwell after each such move, injection means carried by said support and including an injector nozzle movable to and from a position of operative engagement with the mold at said molding station, means operating in timed relation with the wheel-turning means to move said injector nozzle to and from engagement with the mold at the molding station between successive advances of the wheel, and means for automatically closing each said mold as it approaches said molding station and opening the same after it has left the molding station.

2. A machine of the class described comprising a support, a wheel rotatable on said support, said wheel having a circumferential wire-receiving groove therein, a series of separate molds spaced at intervals along the circumference of said wheel, each said mold having a bottom part fixed on said wheel and a removable cover, a core pin associated with each said mold, means carried by said wheel operable to insert each said pin into its corresponding mold and to remove it therefrom, means for imparting step-by-step rotation of said wheel to move said molds successively to a molding station with a dwell after such move, injection means carried by said support and including an injector nozzle movable to and from a position of operative engagement with the mold at said molding station, cam means carried by said support and engageable by said pin inserting means to insert each said pin before its mold moves into said molding station and to remove each pin from its mold after it has left said molding station, means for automatically closing each said mold as it approaches said molding station and opening said mold after it has left the molding station, and means operating in timed relation with the wheel turning means to move said injector nozzle to and from engagement with the mold at the molding station between successive advances of the wheel.

References Cited in the file of this patent

UNITED STATES PATENTS

| | | |
|---|---|---|
| 2,282,308 | Dahlin | May 12, 1942 |
| 2,351,774 | McGowen | June 20, 1944 |
| 2,386,697 | Lynch | Oct. 9, 1945 |